(12) United States Patent
Soldan et al.

(10) Patent No.: US 11,173,969 B2
(45) Date of Patent: Nov. 16, 2021

(54) FOUR-POINT CAB SUSPENSION SYSTEM

(71) Applicant: AGCO Corporation, Duluth, GA (US)

(72) Inventors: Daniel J. Soldan, Des Moines, IA (US); Jarred M. Jennings, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 66 days.

(21) Appl. No.: 16/610,359

(22) PCT Filed: Apr. 12, 2018

(86) PCT No.: PCT/IB2018/000365
§ 371 (c)(1),
(2) Date: Nov. 1, 2019

(87) PCT Pub. No.: WO2018/203124
PCT Pub. Date: Nov. 8, 2018

(65) Prior Publication Data
US 2020/0140022 A1 May 7, 2020

Related U.S. Application Data

(60) Provisional application No. 62/492,391, filed on May 1, 2017.

(51) Int. Cl.
*B62D 33/06* (2006.01)
*B60G 15/06* (2006.01)

(52) U.S. Cl.
CPC ....... *B62D 33/0608* (2013.01); *B60G 15/063* (2013.01); *B60G 15/067* (2013.01);
(Continued)

(58) Field of Classification Search
CPC ............ B62D 33/0608; B62D 33/0604; B62D 33/06; B62D 33/0617; B60G 15/063;
(Continued)

(56) References Cited

U.S. PATENT DOCUMENTS 3,784,219 A * 1/1974 Van Der Burgt ...... B60G 11/32
280/104
4,203,499 A 5/1980 Miyata
(Continued)

FOREIGN PATENT DOCUMENTS

CA 1 264 345 A 1/1990
DE 10133969 A1 * 2/2003 ............. B62D 33/06
(Continued)

OTHER PUBLICATIONS

UK Intellectual Property Office, Search Report for priority UK Application No. GB 1707750.4, dated Nov. 9, 2017.
(Continued)

*Primary Examiner* — James A English
*Assistant Examiner* — Kurtis Nielson

(57) ABSTRACT

In one embodiment, a suspension system for a vehicle cab, the suspension system comprising: a structural assembly; a cab mounted to the structural assembly; and plural suspension units arranged between the cab and the structural assembly, the plural suspension units comprising, fore and aft, a first pair of suspension units and a second pair of suspension units, wherein a lateral distance between the second pair of suspension units is greater than a lateral distance between the first pair of suspension units.

16 Claims, 6 Drawing Sheets

(52) U.S. Cl.
CPC .............. *B60G 2202/152* (2013.01); *B60G 2204/1242* (2013.01); *B60G 2204/15* (2013.01); *B60G 2204/162* (2013.01); *B60G 2300/08* (2013.01)

(58) Field of Classification Search
CPC ............ B60G 15/067; B60G 2202/152; B60G 2204/1242; B60G 2204/162; B60G 2300/08
See application file for complete search history.

(56) References Cited

U.S. PATENT DOCUMENTS

| | | | | |
|---|---|---|---|---|
| 5,520,259 | A * | 5/1996 | Onohara | B62D 33/0608 180/89.12 |
| 5,590,733 | A * | 1/1997 | Ljungholm | B62D 33/0608 180/89.14 |
| 7,300,100 | B2 | 11/2007 | McLean et al. | |
| 7,744,149 | B2 * | 6/2010 | Murray | B62D 33/0608 296/190.07 |
| 2004/0080181 | A1 * | 4/2004 | Puterbaugh | F16F 13/002 296/190.01 |
| 2006/0096269 | A1 | 5/2006 | McLean et al. | |
| 2011/0108333 | A1 * | 5/2011 | Dunn | B62D 11/006 180/6.48 |
| 2011/0248464 | A1 * | 10/2011 | Buhl | B60G 99/008 280/124.108 |
| 2011/0266727 | A1 | 11/2011 | Knevels | |
| 2014/0319876 | A1 * | 10/2014 | Schauer | B60G 99/008 296/190.07 |
| 2015/0344083 | A1 * | 12/2015 | Safiejko | B62D 33/0608 296/190.07 |

FOREIGN PATENT DOCUMENTS

| | | | | |
|---|---|---|---|---|
| DE | 102015115009 A1 * | 3/2017 | | F16F 15/022 |
| EP | 0908376 A2 | 4/1999 | | |
| EP | 1645494 A2 | 4/2006 | | |
| JP | 11263248 A * | 9/1999 | | B62D 33/0604 |
| WO | WO-9708038 A1 * | 3/1997 | | B60G 99/004 |
| WO | 2009/144174 A1 | 12/2009 | | |

OTHER PUBLICATIONS

European Patent Office, International Search Report for related International Application No. PCT/IB2018/000365, dated Jul. 24, 2018.

* cited by examiner

FOUR-POINT CAB SUSPENSION SYSTEM

TECHNICAL FIELD

The present disclosure is generally related to vehicle cab suspension systems.

BACKGROUND

Current cab suspension systems suffer from reduced comfort for the operator due in large part to high roll stiffness. Roll refers to side-to-side movement of the cab, or similarly, load transfer of the cab toward the outside. Roll stiffness refers to the torque applied by the suspension system as the cab rolls due to rotational force applied to the cab (e.g., as measured in pound-feet per degree of roll). For instance, 2-point suspension systems possess high roll stiffness due to rubber mounts in the front between the cab and the frame, and 4-point suspension systems have high roll stiffness due to an anti-roll bar added to control the roll stiffness given the inability of current 4-point suspension systems to adequately control cab roll without the anti-roll bar. Indeed, high roll stiffness occurs regardless of whether rubber mounts are placed in the front or the back of the cab.

BRIEF DESCRIPTION OF THE DRAWINGS

Many aspects of certain embodiments of 4-point cab suspension systems and methods can be better understood with reference to the following drawings. The components in the drawings are not necessarily to scale, emphasis instead methods. Moreover, in the drawings, like reference numerals designate corresponding parts throughout the several views.

DESCRIPTION OF EXAMPLE EMBODIMENTS

Overview

Figure 1:
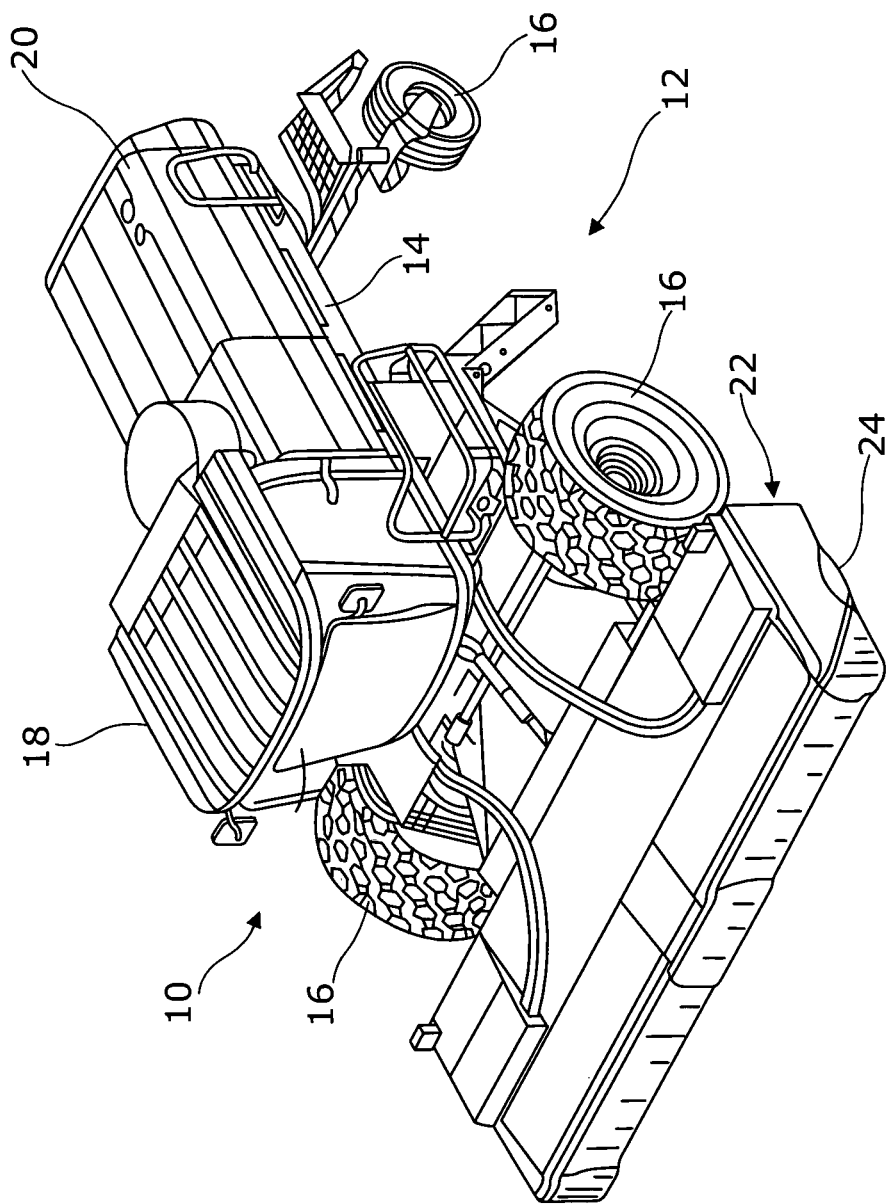
FIG. 1 is a schematic diagram that illustrates, in front perspective view, an example vehicle in which an embodiment of a 4-point cab suspension system may be implemented.

In one embodiment, a suspension system for a vehicle cab, the suspension system comprising: a structural assembly; a cab mounted to the structural assembly; and plural suspension units arranged between the cab and the structural assembly, the plural suspension units comprising, fore and aft, a first pair of suspension units and a second pair of suspension units, wherein a lateral distance between the second pair of suspension units is greater than a lateral distance between the first pair of suspension units.

Detailed Description

Certain embodiments of a four-point (hereinafter, 4-point) cab suspension system and method are disclosed that comprise a pair of rear suspension units spaced wider apart than a pair of front suspension units, which improves cab roll control over a 4-point suspension system that mounts the suspension units according to a square or rectangle and over 2-point systems. The embodiments described below are in the context of a vehicle embodied as an agricultural vehicle, and in particular, a self-propelled windrower, with the understanding that cab suspension systems for other vehicles may be used in some embodiments.

Digressing briefly, some vehicles operate under conditions that demand sufficient cab roll control. For instance, in the agricultural equipment industry, agricultural vehicles such as windrowers generally have a wide track agricultural machines. When the left or right wheel encounters obstacles in the field, such as gopher holes or other field obstacles or terrain discontinuities, there is a tendency toward cab roll that needs sufficient roll control to enable operator comfort, as excessive rolling motion is generally considered a discomforting sensation to people in general (e.g., particularly when compared to the heave (up-down) motion of the vehicle). Conventional 2-point windrower cab suspensions use front isolation mounts (hereinafter, simply mounts or rubber mounts, which have a total deformation that is measured in millimeters), which are applicable for control of high-frequency (e.g., greater than approximately 10-12 Hz), small displacement disturbances or vibrations, such as those that are generated by the machine (windrower) or machine components (e.g., hydraulic pumps, the engine, etc.). In other words, isolation mounts are too stiff to attenuate low frequency forces. When the windrower encounters a disturbance on only one side (e.g., a gopher mound), the entire windrower rolls as the tire travels up and over the mound. That is, with the high roll stiffness of isolation mounts, the cab rolls with the vehicle. The terrain, on the other hand, is a source of the low frequency vibrations (e.g., the terrain causes the low frequency vibrations experienced by an operator in the cab, such as those corresponding to cab roll), which suspension units (construed herein as low frequency suspension units, including air spring or coil over shock absorber in an integrated or physically separate packages or units) are intended to address. Note that total travel of suspension units, unlike isolation mounts, is measured in inches under where the suspension units are disposed between the frame and the cab in a square or rectangular arrangement, roll control is achieved with a roll bar, which likewise results in discomfort for the operator due to high roll stiffness.

In contrast, certain embodiments of a 4-point cab suspension system may improve ride comfort for the operator through the use of suspension units (i.e., low frequency suspension units) mounted beneath the cab in a mounting arrangement where the rear pair of suspension units are spaced wider apart than the front pair of suspension units. In some embodiments, these suspension units are passive (e.g., not electronically or manually adjustable in the field). Such an arrangement of low-frequency type, passive suspension units enables the cab motion to more closely achieve one goal of trying to keep the cab approximately level as the windrower travels over terrain while enabling the omission of an anti-roll bar, improving comfort for the operator over conventional cab suspension systems.

Having summarized certain features of a 4-point cab suspension system of the present disclosure, reference will now be made in detail to the description of a 4-point cab suspension system as illustrated in the drawings. While an example 4-point cab suspension system will be described in connection with these drawings, there is no intent to limit it to the embodiment or embodiments disclosed herein. For instance, as indicated above, certain embodiments of a 4-point cab suspension system are described in the context of its use in an agricultural vehicle, and in particular, a self-propelled windrower. However, in agricultural vehicles, or in vehicles used in other industries, including mining, construction, military, government, etc. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the vehicle (e.g., windrower) looking forwardly. The terms fore and aft and transverse, as used herein, are referenced to the longitudinal centerline of the windrower chassis as the windrower travels in a forward direction. Also, note that reference to a passive suspension system refers to the fact that there is no manual or computer-assisted change in dampening in the field. Passive is distinct from semi-active or active type control. Semi-active type control involves monitoring movement of the cab and reacting by changing the dampening rates with respect to position in dampener stroke and rate of change. Active type control refers to use of actuators (e.g., in a dampening component) to control motion in order for the cab to remain stationary while the chassis moves underneath the cab. Further, note that reference to having a wider lateral example rear width-to-front width ratio of approximately 1.3. In some embodiments, the rear width-to-front width ratio may be greater, or slightly less in some embodiments.

Referring now to FIG. 1, shown is an example vehicle, and in particular, a self-propelled windrower 10, in which an embodiment of a 4-point cab suspension system 12 may be implemented. One having ordinary skill in the art should appreciate in the context of the present disclosure that the example windrower 10 depicted in FIG. 1 is of one type of self-propelled design, and that other windrower designs or other types of vehicles may be used and hence are contemplated to be within the scope of the disclosure. The windrower 10 is operable to mow and collect standing crop in the field, condition the cut material (e.g., using one or more pairs of conditioner rolls) to improve its drying characteristics, and then return the conditioned material to the field in a windrow or swath. The windrower 10 may include a chassis or frame 14 supported by wheels 16 (although tracks may be used in some embodiments, or other configurations in the number and/or arrangement of wheels may be used in some embodiments) for movement across a field to be harvested. The chassis 14 supports a cab 18, within which an operator may control certain operations of the windrower 10, and a rearwardly spaced compartment 20 housing a power source (not shown) such as an internal combustion engine. The chassis 14 also supports a ground drive system that, in one embodiment, when powered by the engine, causes differential rotation of the wheels (e.g., increasing the speed of path steering mechanism as is known in the art. In some embodiments, other mechanisms for enabling navigation and/or traversal of the field may be used.

A coupled working implement, depicted in FIG. 1 as a harvesting header 22, is supported on the front of the chassis 14 in a manner understood by those skilled in the art. The header 22 may be configured as a modular unit and consequently may be disconnected for removal from the chassis 14. As is also known in the art, the header 22 has a laterally extending crop cutting assembly 24 in the form of a low profile, rotary style cutter bed located adjacent the front of the header 22 for severing crop from the ground as the windrower 10 navigates across a surface in the field. However, one skilled in the art will understand that other types of crop cutting assemblies 24, such as sickle style cutter beds, may also be used in some embodiments.

The windrower 10 also includes the 4-point cab suspension system 12, which includes plural suspension units that are disposed between the cab 18 and the chassis 14 to improve ride comfort for the operator, as explained further below. For air spring-based suspension units, additional components may include a source of air (e.g., compressor) as is known to those having ordinary skill in the art.

During a harvesting operation, the windrower 10 moves forward through the field with the header 22 lowered to a working height. Ground conditions (e.g., moist ground, soft ground, etc.), including ground surface topology (e.g., bumpy terrain, smooth terrain, obstacles, etc.), encountered by the tires, impose low the ride. The 4-point cab suspension system 12 ensures a comfortable ride for the operator despite the condition of the terrain the windrower 10 encounters.

Figure 2:
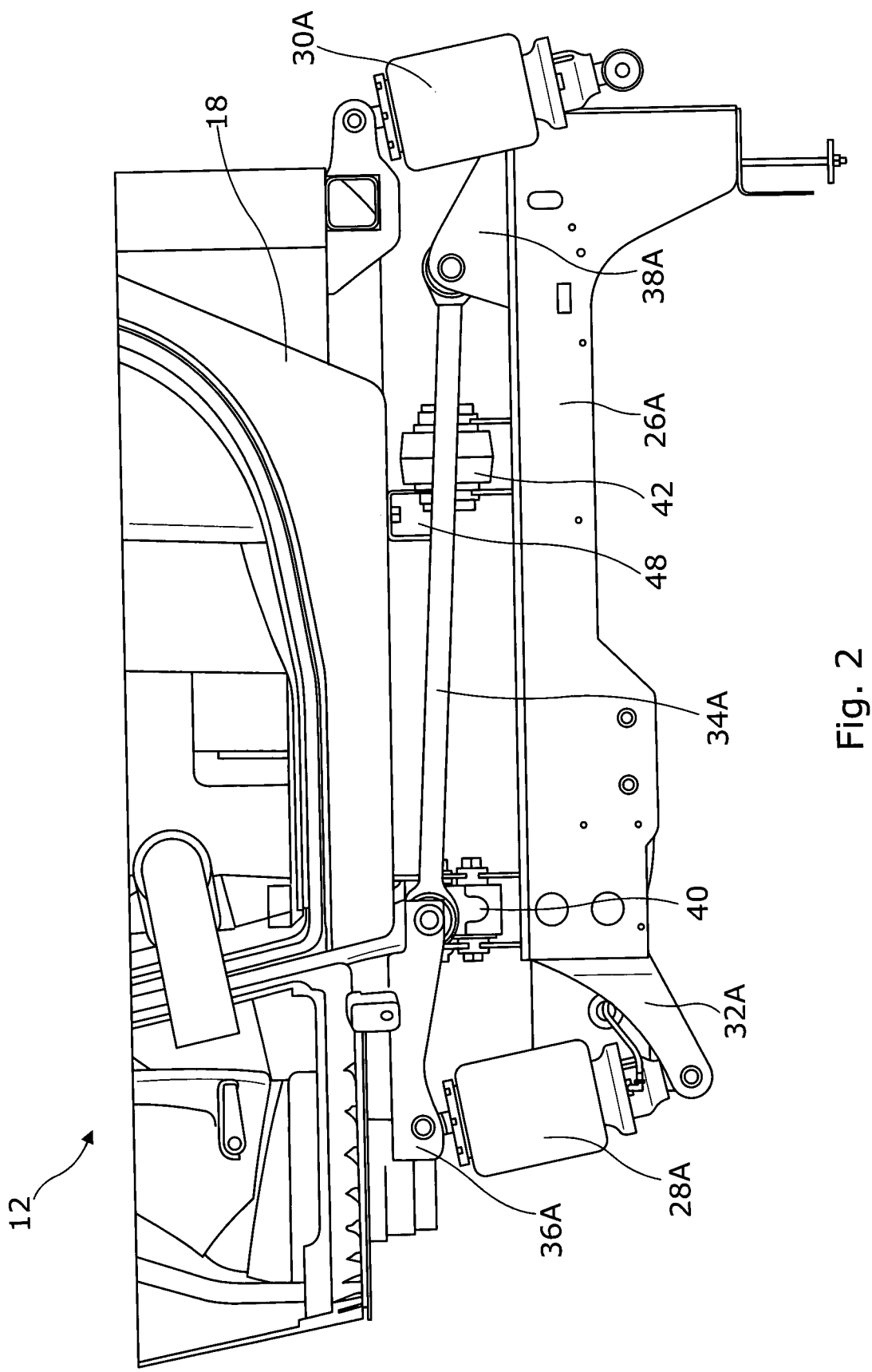
FIG. 2 is a schematic diagram that illustrates, in fragmentary, side elevation view, an embodiment of a 4-point cab suspension system.

Attention is now directed to FIG. 2, which illustrates an embodiment of the 4-point cab suspension system 12. Certain known components, which would be readily apparent to one having ordinary skill in the art, are omitted from FIG. 2 to avoid obfuscating relevant components of the 4-point cab suspension system 12. In one embodiment, the 4-point cab suspension system 12 comprises the cab 18, a sub-frame 26 (e.g., in one embodiment comprising at least two pieces, one shown in FIG. 2 and denoted 26A) to which the cab 18 is mounted, a pair of front suspension units 28 (one shown in FIG. 2, denoted as suspension unit 28A) coupled to the front of the sub-frame 26, and a pair of rear suspension units 30 (one shown in FIG. 2, denoted as suspension unit 30A) coupled to the chassis 14 (not depicted in FIG. 2). The sub-frame 26 and the chassis or frame 14 of the windrower 10 (FIG. 1) are collectively referred to herein as a structural assembly. It should be appreciated by one having ordinary skill in the art that, though the sub-frame 26 is shown disposed between the cab 18 and the chassis 14, in some embodiments, the sub-frame 26 may be omitted (and hence both the front pair of suspension units 28 and the rear pair of suspension units 30 may both be attached directly to the chassis 14), as long as the lateral distance between the rear pair of suspension units 30 is greater than the lateral distance between the front pair of suspension units 28. In some embodiments, other variations in attachment connection between the cab 18 and the chassis 14 (e.g., using one weld, bolts, tacks, etc. to the front suspension units 28 or cab 18) are contemplated, as long as the lateral distance between the rear pair of suspension units 30 is greater than the lateral distance between the front pair of suspension units 28. The suspension units 28, 30 provide for a passive, 4-point suspension system. In one embodiment, the suspension units 28, 30 are each configured as integrated air spring over damper (shock absorber) types of suspension units. The air spring may comprise integrated (or external in some embodiments) leveling valves that add or release air from the air springs, as is known. In some embodiments, the suspension units 28, 30 are each configured as integrated coil over shock absorber types of suspension units. In some embodiments, the suspension units 28, 30 are each configured as two physically separate components that collectively function together, wherein one component comprises either an air spring or coil spring and the other component comprises a shock absorber. In some embodiments, there may be a mixture of different types of the aforementioned suspension units 28, 30.

Figure 3A:
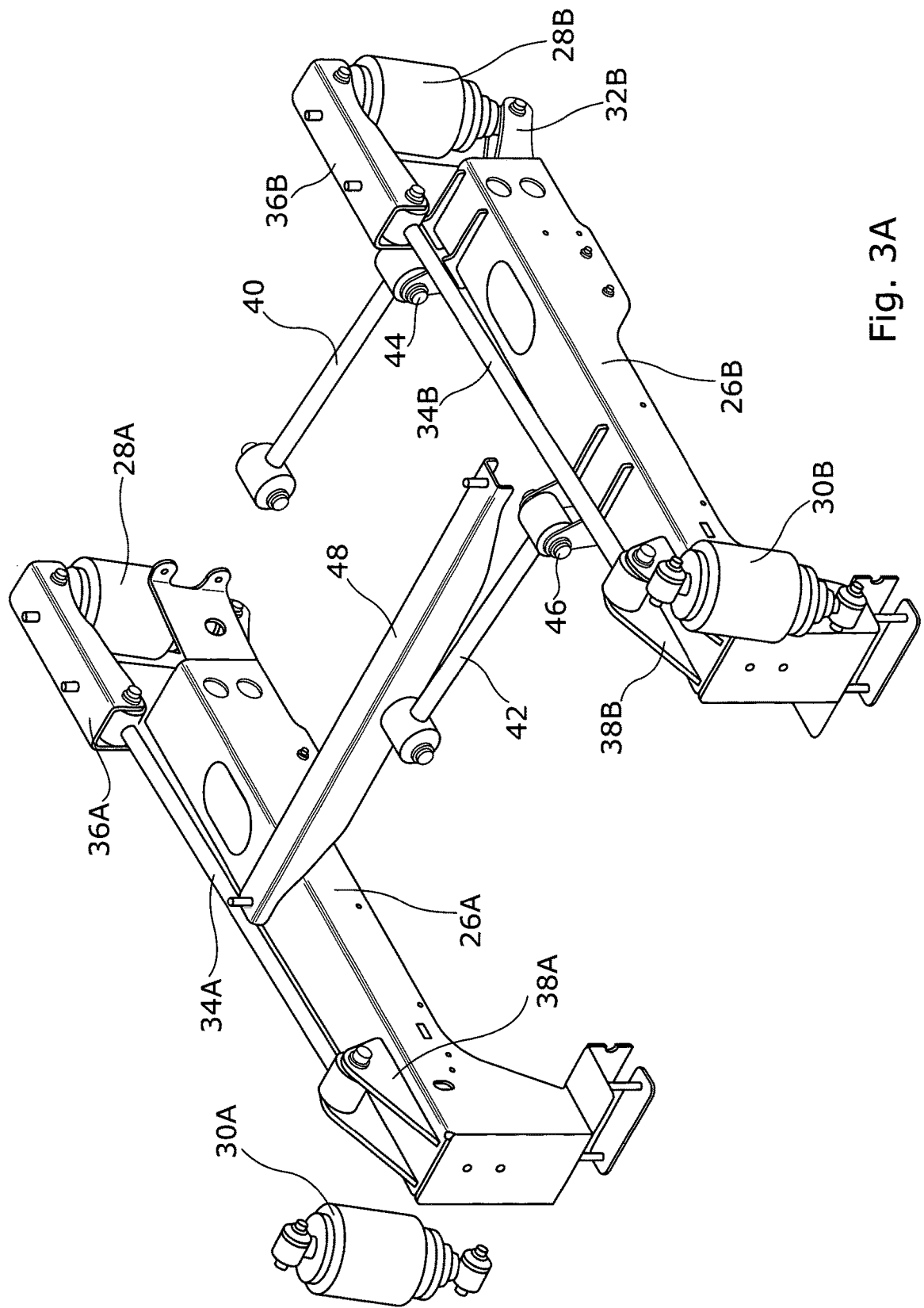
FIG. 3A is a schematic diagram that illustrates, in fragmentary, rear-perspective view, select components of an embodiment of a 4-point cab suspension system.
Figure 3B:
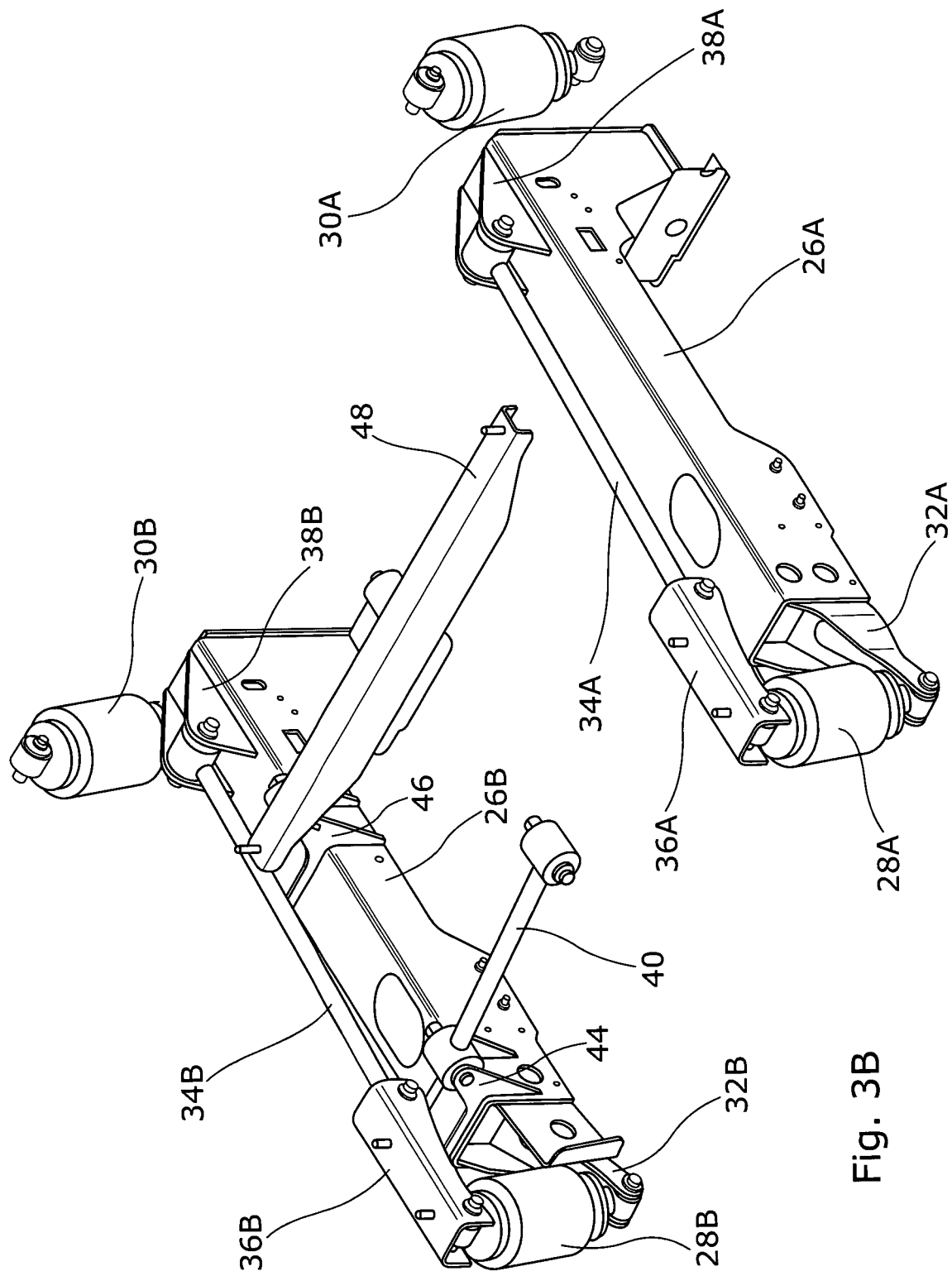
FIG. 3B is a schematic diagram that illustrates, in fragmentary, front-perspective view, select components of an embodiment of a 4-point cab suspension system.
Figure 3C:
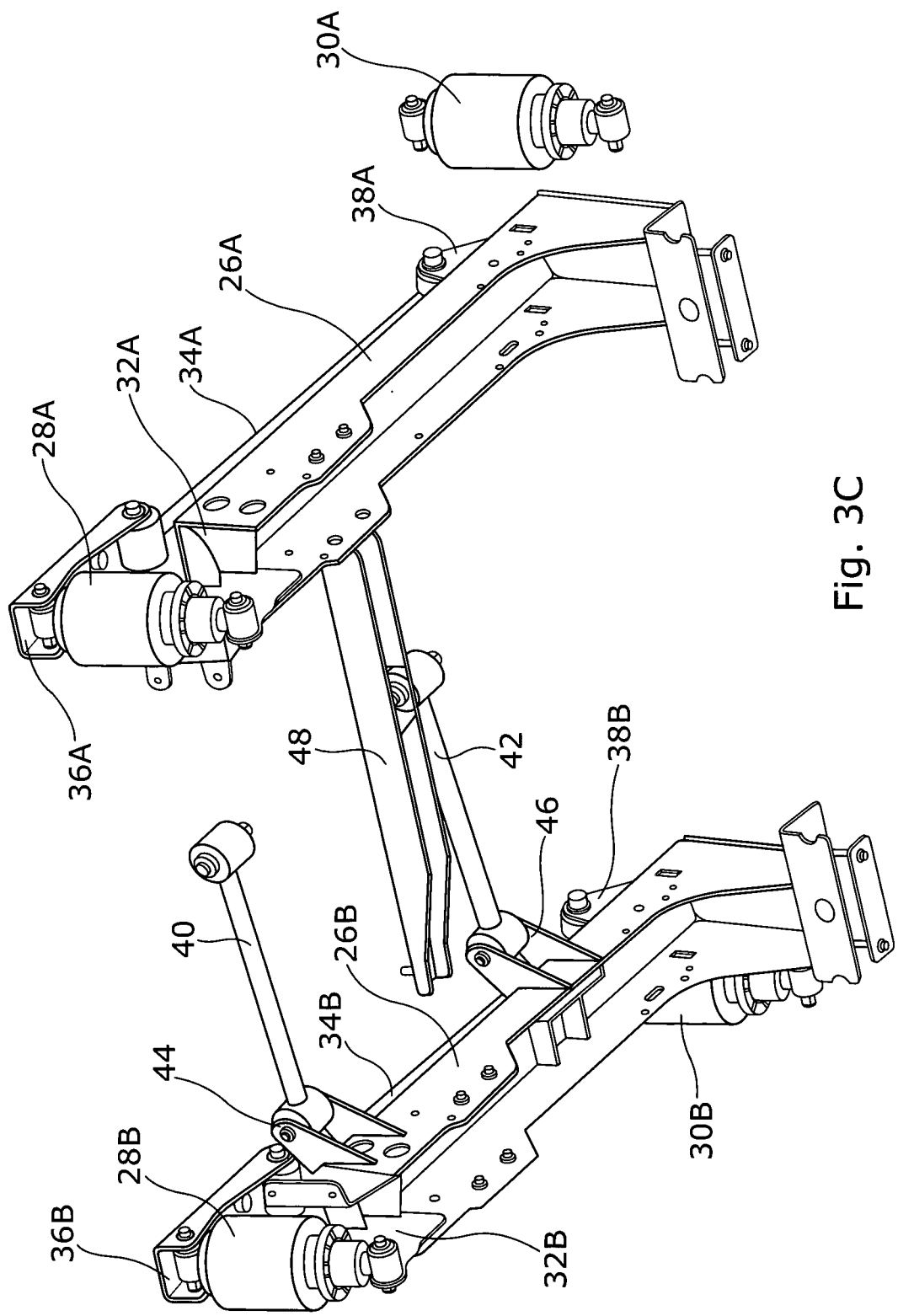
FIG. 3C is a schematic diagram that illustrates, in fragmentary, front bottom perspective view, select components of an embodiment of a 4-point cab suspension system.

With continued reference to FIG. 2, attention is directed to FIGS. 3A-3C, which illustrate various views of select portions of the 4-point cab suspension system 12 shown in FIG. 2. Each of the front pair of suspension units 28 is respectively attached at one end (lower end) of the suspension unit 28 to a bracket 32 (e.g., 32A, 32B) extending forwardly from the sub-frame 26 (e.g., 26A, 26B), the bracket 32 affixed (attached and affixed used interchangeably herein) to the sub-frame 26 using known attachment mechanisms (e.g., weld, suspension units 28 is coupled to the cab 18 (proximal the forward portion of the cab 18) via a respective longitudinal bar or member 34 (e.g., 34A, 34B).

In one embodiment, one end (the forward end) of each longitudinal member 34 is attached to a front mount bracket 36 (e.g., 36A, 36B) that couples the forward end of the longitudinal member 34 to the cab 18. In one embodiment, the front mount bracket 36 is of a generally rectangular, U-shaped configuration, with the top surface of the front mount bracket 36 affixed to a bottom surface (or intervening structure) of the cab 18, and at one end (rearward end), affixed (e.g., bolted) between the U-shaped walls of the front mount bracket 36 to the forward end (e.g., ring or trunnion mount) of the longitudinal member 34, and at the other (forward) end of the front mount bracket 36, affixed (e.g., bolted) between the U-shaped walls of the front mount bracket 36 to a top mounting end (e.g., ring or trunnion mount) of the front suspension unit 28. The other end (rearward end) of each longitudinal member 34 is pivotably coupled to a rear mount bracket 38 (e.g., 38A, 38B). In one embodiment, the rear mount bracket 38 is configured as a trunnion, with upright, generally triangular side walls to which the rearward end (e.g., ring or trunnion mount) of the longitudinal member 34 is affixed (e.g., bolted) and free to pivot. The rear mount bracket 38 is affixed (e.g., welded, tracked, bolted, etc.) to a top surface of the sub-frame 26.

Coupled to one of the sub-frames (sub-frame 26B), fore and aft, are respective transverse members 40 and 42, which in one embodiment are transverse to the sub-frame 26B (and beneath a portion of the cab 18, extending to approximately the longitudinal midline of the cab 18). In some embodiments, the transverse members 40 and 42 may be coupled to the opposing sub-frame 26A instead. In one embodiment, the transverse members 40 and 42 are of equal length or approximately equal length (e.g., enabling concurrent movement in an arc as the cab 18 moves up and down), and are each pivotably coupled to fore and aft mount brackets 44 and 46, respectively. In one embodiment, the mount brackets 44 and 46 may be configured as trunnions affixed (e.g., welded, tacked, etc.) to the top and internal side surfaces of the sub-frame 26B. The mount brackets 44 and 46 are respectively mounted proximal to the rearward end of the brackets 32 and forward of the rear mount brackets 38. The transverse member 40 is attached at the end opposite the pivotal attachment to the underside surface of the cab 18, approximately at the longitudinal midline of the cab 18. For instance, the transverse member 40 may be attached to a U-shaped bracket, in somewhat similar manner to the attachment mechanism and structure of the structural member 48, which in turn is attached to the underside of the cab 18 (a portion of the U-shaped bracket is shown in FIG. 2). The transverse member 42 is attached at the end opposite of the pivotal attachment to a structural member 48, the structural member 48 attached at one end to the top surface of the sub-frame 26A. The structural member 48 is of a generally U-shaped configuration, with the top surface attached to the underside of the cab 18 and the non-pivotal side of the transverse member 42 attached to the some structural support for the transverse member 42 to be affixed to (e.g., bolted through a ring or trunnion of the transverse member 42, though other mechanism to secure the transverse member 42 to the structural member 48 may be used).

The longitudinal members 34 and the transverse members 40, 42 effectively secure the cab 18 to the structural assembly, and more specifically, enable the cab 18 some freedom of movement (e.g., up-down, pitch, roll) while holding the cab 18 in position. The transverse members 40, 42 help prevent movement of the cab 18 side-to-side, and the transverse member 40 further provides some resistance to twisting motion of the cab 18. The longitudinal members 34 support the cab 18 fore and aft and help prevent twisting movement of the cab 18.

As described above, the rear suspension units 30 are spaced farther apart from each other (referring to the lateral distance between each unit of the rear pair 30) than the front suspension units 28 (again, referring to the lateral distance between each unit of the front pair 28), which provides for improved roll control versus conventional 2-point or 4-point suspension systems and renders unnecessary the need for an anti-roll bar (which for conventional 4-point suspension systems, is generally arranged with two connection points to the chassis and two connection points to the underside of the cab, and is generally used to convert side-side movement to up-down movement). In one embodiment, the rear pair of suspension units 30 are spaced apart spaced apart approximately 1067 mm. These dimensions are one example, and in some embodiments, other dimensions (of the same or different ratio) may be used. In effect, there is improved comfort through the improvement in roll control and omission of the anti-roll bar, and reduced assembly and material.

It should be appreciated by one having ordinary skill in the art, in the context of the disclosure, that particular details of the assembly and/or construction of the 4-point cab suspension system 12 is illustrative of one embodiment, and that variations to the above description may be implemented while preserving the difference in lateral spacing between the rear suspension units 30 relative to the lateral distance between the front suspension units 28 and hence are contemplated to be within the scope of the disclosure.

Figure 4:
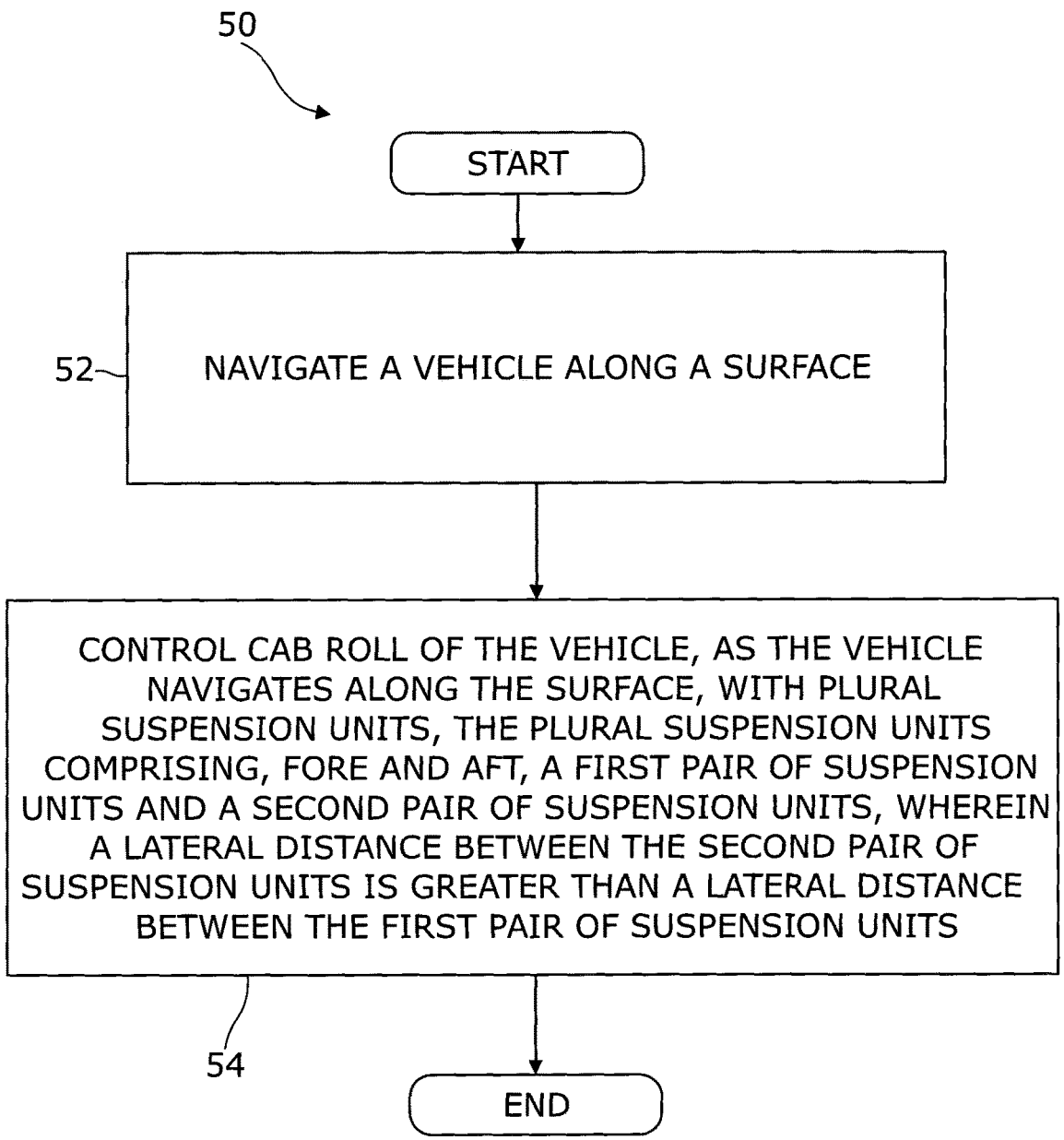
FIG. 4 is a flow diagram that illustrates an embodiment of an example 4-point cab suspension method.

In view of the above description, it should be appreciated that one embodiment of a 4-point cab suspension method 50, depicted in FIG. 4, comprises navigating a vehicle along a surface (52); and controlling cab roll of the vehicle, as the vehicle navigates along the surface, with plural suspension units, the plural suspension units comprising, fore and aft, a first pair of suspension units and a second pair of suspension units, wherein a lateral distance between the second pair of suspension units is greater than a lateral distance between the first pair of suspension units (54).

Any process descriptions or blocks in flow diagrams should be understood as representing steps in a process, and alternate implementations are included understood by those reasonably skilled in the art of the present disclosure.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the systems and methods have been described with reference to the example embodiments illustrated in the attached drawing figures, it is noted that equivalents may be employed and substitutions made herein without departing from the scope of the disclosure as protected by the following claims.

At least the following is claimed:

1. A suspension system for a vehicle cab, the suspension system comprising:
   a structural assembly comprising a vehicle frame and a sub-frame mounted to the vehicle frame;
   a cab mounted to the structural assembly; and
   plural suspension units arranged between the cab and the structural assembly, the plural suspension units comprising, fore and aft, a first pair of suspension units and a second pair of suspension units, wherein the first pair of suspension units are attached to the sub-frame and the second pair of suspension units are attached to the vehicle frame, and a lateral distance between the second pair of suspension units is greater than a lateral distance between the first pair of suspension units.

2. The suspension system of claim 1, wherein the plural suspension units are arranged between the cab and the structural assembly without a roll bar.

3. The suspension system of claim 1, wherein at least one of the first and second pairs of suspension units comprises a coil over shock absorber.

4. The suspension system of claim 1, wherein at least one of the first and second pairs of suspension units comprises an integrated air spring over shock absorber.

5. The suspension system of claim 1, wherein at least one of the first and second pairs of suspension units comprises two separate components, wherein one of the two components comprises either a coil or air spring and the other of the two components comprises a shock absorber.

6. The suspension system of claim 1, wherein the plural suspension units comprise either all integrated air spring over shock absorbers, all coil over shock absorbers, or two components for each of the plural suspension units that collectively function together, one of the two components comprising either all coil or all air springs and the other of the two components consisting of a shock absorber.

7. The suspension system of claim 1, wherein the plural suspension units comprise a passive system.

8. A vehicle, comprising:
   an engine;
   a structural assembly comprising a vehicle frame and a sub-frame mounted to the vehicle frame;
   a cab mounted to the structural assembly; and
   plural suspension units arranged between the cab and the structural assembly, the plural suspension units comprising, fore and aft, a first pair of suspension units and a second pair of suspension units, wherein the first pair of suspension units are attached to the sub-frame and the second pair of suspension units are attached to the vehicle frame, and a lateral distance between the second pair of suspension units is greater than a lateral distance between the first pair of suspension units.

9. The vehicle of claim 8, wherein the plural suspension units are arranged between the cab and the structural assembly without a roll bar.

10. The vehicle of claim 8, wherein at least one of the first and second pairs of suspension units comprises a coil over shock absorber.

11. The vehicle of claim 8, wherein at least one of the first and second pairs of suspension units comprises an integrated air spring over shock absorber.

12. The vehicle of claim 8, wherein at least one of the first and second pairs of suspension units comprises two separate components, wherein one of the two components comprises either a coil or air spring and the other of the two components comprises a shock absorber.

13. The vehicle of claim 8, wherein the plural suspension units comprise either all integrated air spring over shock absorbers, all coil over shock absorbers, or two components for each of the plural suspension units that collectively function together, one of the two components comprising either all coil or all air springs and the other of the two components consisting of a shock absorber.

14. The vehicle of claim 8, wherein the plural suspension units comprise a passive system.

15. The vehicle of claim 8, wherein the vehicle comprises a self-propelled windrower; and a dual path steering system coupled to the structural assembly.

16. A cab suspension method for a vehicle, the method comprising:
   navigating the vehicle along a surface; and
   controlling cab roll of the vehicle, as the vehicle navigates along the surface, with plural suspension units, the plural suspension units comprising, fore and aft, a first pair of suspension units attached to a subframe of a structural assembly and a second pair of suspension units, attached to a vehicle frame, wherein a lateral distance between the second pair of suspension units is greater than a lateral distance between the first pair of suspension units.

* * * * *